United States Patent
Reed et al.

(10) Patent No.: US 11,135,614 B1
(45) Date of Patent: Oct. 5, 2021

(54) GOLF CLUB HEAD WITH POLYMER COATED FACE

(71) Applicant: Callaway Golf Company, Carlsbad, CA (US)

(72) Inventors: Nathan Samuel Reed, San Diego, CA (US); Denver Holt, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 16/920,610

(22) Filed: Jul. 3, 2020

Related U.S. Application Data

(63) Continuation-in-part of application No. 16/800,323, filed on Feb. 25, 2020.

(60) Provisional application No. 62/912,559, filed on Oct. 8, 2019.

(51) Int. Cl.
  *B05D 1/32* (2006.01)
  *B23K 9/00* (2006.01)
  *A63B 53/04* (2015.01)

(52) U.S. Cl.
  CPC .............. *B05D 1/32* (2013.01); *B23K 9/0026* (2013.01); *A63B 53/045* (2020.08); *A63B 53/047* (2013.01); *A63B 53/0412* (2020.08); *A63B 53/0458* (2020.08); *A63B 53/0466* (2013.01); *A63B 2209/02* (2013.01)

(58) Field of Classification Search
  CPC .................. B05D 1/32; B23K 9/0026
  See application file for complete search history.

(56) References Cited

U.S. PATENT DOCUMENTS

| | | | | |
|---|---|---|---|---|
| 5,112,683 A | * | 5/1992 | Johansen | B05B 12/20 428/354 |
| 5,351,958 A | * | 10/1994 | Helmstetter | A63B 60/00 473/346 |
| 5,643,111 A | * | 7/1997 | Igarashi | A63B 53/0466 473/332 |
| 6,420,100 B1 | * | 7/2002 | Trokhan | B05D 1/42 165/116 |
| 7,585,233 B2 | * | 9/2009 | Horacek | A63B 60/00 473/345 |
| 10,188,915 B1 | * | 1/2019 | Hoffman | A63B 53/0466 |
| 2005/0278931 A1 | * | 12/2005 | Deshmukh | A63B 53/0466 29/469 |
| 2011/0218050 A1 | * | 9/2011 | Ballenger | A63B 53/0487 473/330 |
| 2016/0067558 A1 | * | 3/2016 | Trahan | C23C 14/028 473/349 |
| 2016/0222222 A1 | * | 8/2016 | Stupar | F16B 33/06 |

(Continued)

*Primary Examiner* — Michael D Dennis
(74) *Attorney, Agent, or Firm* — Rebecca Hanovice; Michael Catania; Sonia Lari

(57) ABSTRACT

Methods of applying a polymeric coating to a rear face surface of golf club heads with variable face thickness are disclosed herein. The coating, which preferably comprises polyurea, improves the durability of the face and reduces the hits to failure ratio of the golf club head. The coating improves the performance of the golf club head because it allows for reduction in overall face thickness and easy post-process manipulation to allow for fine-tuning of mass properties after production. The reduction in thickness leads to overall weight reduction, because the polymer is roughly a quarter of the density of titanium or stainless steel, and also reinforces the face, thereby increasing the lifespan of the club.

6 Claims, 18 Drawing Sheets

(56) References Cited

U.S. PATENT DOCUMENTS

2017/0173418 A1* 6/2017 Seluga .................. A63B 60/00
2018/0104715 A1* 4/2018 Lee ........................ B05B 1/044
2018/0200593 A1* 7/2018 Golden ................. A63B 60/54

* cited by examiner

| Sample Type/No. | Before Coating | | | | After Coating | | | | |
|---|---|---|---|---|---|---|---|---|---|
| Type | Mass (g) | CT (μs) | COR (Center) | COR (HS) | Mass (g) | CT (μs) | COR (Center) | COR (HS) | Durability (# of Hits) |
| 5g Polymer Coated Face | 193.6 | 257 | 0.839 | 0.842 | 193.5 | 260 | 0.837 | 0.841 | 300 |
|  | 189.9 | 251 | 0.840 | 0.843 | 190.0 | 259 | 0.839 | 0.840 | 400 |
|  | 190.8 | 248 |  |  | 190.7 | 258 |  |  | 300 |
| 10g Polymer Coated Face | 191.4 | 248 | 0.836 | 0.840 | 191.4 | 250 | 0.832 | 0.833 | 500 |
|  | 190.9 | 257 | 0.837 | 0.842 | 191.0 | 263 | 0.836 | 0.841 | 612 |
|  | 190.5 | 251 |  |  | 190.3 | 256 |  |  | 300 |
| Non Coated Face |  |  |  |  | 190.4 | 250 |  |  | 197 |
|  |  |  |  |  | 192.7 | 255 |  |  | 350 |
|  |  |  |  |  | 190.2 | 250 |  |  | 358 |

FIG. 10

| Average Change from Non-Coated |||||
|---|---|---|---|---|
| Sample Type | CT (μs) | COR (Center) | COR (HS) | Durability (# of Hits) |
| 5g Polymer Coated Face | 7.000 | -0.0015 | -0.0020 | 31.667 |
| 10g Polymer Coated Face | 4.333 | -0.0025 | -0.0040 | 169.000 |

FIG. 11

| Average Percentage Change from Non-Coated (%) |||||
|---|---|---|---|---|
| Sample Type | CT (μs) | COR (Center) | COR (HS) | Durability (# of Hits) |
| 5g Polymer Coated Face | 2.778% | -0.179% | -0.237% | 10.5% |
| 10g Polymer Coated Face | 1.720% | -0.229% | -0.476% | 56.0% |

FIG. 12

GOLF CLUB HEAD WITH POLYMER COATED FACE

CROSS REFERENCES TO RELATED APPLICATIONS

The present application is a continuation-in-part of U.S. patent application Ser. No. 16/800,323, filed on Feb. 25, 2020, which claims priority to U.S. Provisional Application No. 62/912,559, filed on Oct. 8, 2019, the disclosure of each of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to methods of coating a polymer material on at least a portion of a rear surface of the face of golf club head having a variable face thickness pattern.

Description of the Related Art

Golf club heads swung at high speeds experience increased forces placed on their striking faces from high-speed impacts. Performance increases and innovation are thereby limited by the durability of the face. Prior art face reinforcement structures, such as those disclosed in U.S. Pat. No. 6,979,270 to Allen, tend to reduce the performance metrics of the club head, particularly characteristic time (CT) and coefficient of restitution (COR). Therefore, there is a need for a golf club head with greater durability that can withstand high swing speeds while maintaining desirable CT and COR measurements.

BRIEF SUMMARY OF THE INVENTION

The methods of the present invention are directed to coating, with a polymeric material, at least a portion of a rear surface of a variable thickness golf club face. The golf club may be a wood-type golf club head or an iron-type golf club head with a rear medallion.

One aspect of the present invention is a method comprising the steps of providing a golf club head comprising a face wall having an interior-facing surface and an exterior-facing surface, a sole section extending from a lower edge of the face wall, a return section extending from an upper edge of the front wall, an upper opening, at least one stiffening member extending from the sole section to the return section, and an aft end opposite the front wall, the return section disposed between the front wall and the upper opening, affixing a guard fixture to the at least one stiffening member, wherein the guard fixture covers at least a portion of the stiffening member, affixing the golf club head to a level assembly, applying a coating to at least a portion of the interior-facing surface of the face wall, allowing the coating to cure, and removing the guard fixture from the golf club head.

In some embodiments, the step of applying a coating to at least a portion of the interior facing surface may comprise pouring the coating onto the interior-facing surface. In other embodiments, the step of applying a coating to at least a portion of the interior facing surface may comprise injecting the coating with a syringe onto the interior-facing surface. In any embodiment, the coating may comprise polyurea. In some embodiments, the step of applying a coating to at least a portion of the interior-facing surface of the face wall may comprise applying the coating to the entire interior-facing surface of the face wall. In any of the embodiments, the guard fixture may be composed of silicone. In another embodiment, the step of applying a coating to at least a portion of the interior-facing surface of the face wall may comprise the steps of applying 2 to 5 grams of the coating to a toe area of the interior-facing surface, applying 2 to 5 grams of the coating to a central area of the interior-facing surface, and applying 2 to 5 grams of the coating to a heel area of the interior-facing surface.

Another aspect of the present invention is a method comprising the steps of providing a metal golf club body comprising a front wall with a first interior-facing surface, an exterior-facing surface, and a front opening, a sole section extending from a lower edge of the front wall, a return section extending from an upper edge of the front wall, an upper opening, at least one stiffening member extending between the sole section and the return section, and an aft end opposite the front wall, the return section disposed between the front wall and the upper opening, welding a metal face insert within the front opening, the face insert comprising a striking surface, a second interior-facing surface, and a variable thickness pattern, affixing a guard fixture to the at least one stiffening member, wherein the guard fixture covers at least a portion of the stiffening member, affixing the golf club head to a level assembly, applying a coating to at least a portion of the second interior-facing surface so that the coating follows the contours of the variable thickness pattern, and so that a rear surface of the coating is level with a ground plane, allowing the coating to cure, and removing the guard fixture from the golf club head.

In some embodiments, the step of applying a coating to at least a portion of the interior-facing surface of the face wall may comprise the steps of applying 2 to 5 grams of the coating to a toe area of the interior-facing surface, applying 2 to 5 grams of the coating to a central area of the interior-facing surface, and applying 2 to 5 grams of the coating to a heel area of the interior-facing surface. In other embodiments, the guard fixture may be composed of silicone. In another embodiment, the guard fixture may comprise a central piece sized to cover a majority of the at least one stiffening member, and in a further embodiment, the guard fixture may further comprise an edge piece sized to encircle the face insert. In any of the embodiments, the coating may be composed of polyurea. In another embodiment, the at least one stiffening member may be located entirely within 1.00 inch of the second interior-facing surface measured along a vertical plane extending through a geometric center of the face insert.

Yet another aspect of the present invention is a method comprising the steps of providing a golf club head comprising a face with a striking surface, a rear face surface, and a variable thickness pattern, and a top portion, sole portion, heel portion and toe portion encircling at least a portion of the rear face surface to form a body cavity, providing a sealing guard comprising a front surface with a first cavity having a cavity depth, a rear surface opposite the front surface, an injection through-hole extending from the front surface to the rear surface, and at least one venting through-hole extending from the front surface to the rear surface, wherein at least a forward portion of the sealing guard is sized to fit within the body cavity, providing a tilted base comprising a shallow cavity sized to receive the face of the golf club head, placing the golf club head face-down within the shallow cavity so that the body cavity and the rear face surface are exposed, placing the sealing guard within the cavity so that the first cavity faces the rear face surface, injecting a coating material into the sealing guard via the injection through-hole until the coating material fills the first cavity and the at least one venting hole is filled with coating material, allowing the coating material to cure, removing the sealing guard from the cavity, and removing excess coating material from the rear face surface.

In some embodiments, the step of injecting a coating material into the sealing guard via the injection through-hole may comprise the step of coating the entirety of the rear face surface. In any of the embodiments, the coating material may comprise or be composed of polyurea. In another embodiment, the golf club head may be an iron-type golf club head, and the method may further comprise the step of affixing a medallion to the coating on the rear face surface. In any of the embodiments, the sealing guard may be composed of silicone.

Having briefly described the present invention, the above and further objects, features, and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 10 is a chart showing the mass properties of the first and second embodiments of the golf club head of the present invention before and after polymer coating is applied.

FIGS. 11-12 are charts showing the change in mass properties and durability of embodiments of the golf club head of the present invention after polymer coating is applied.

DETAILED DESCRIPTION OF THE INVENTION

Figure 1:
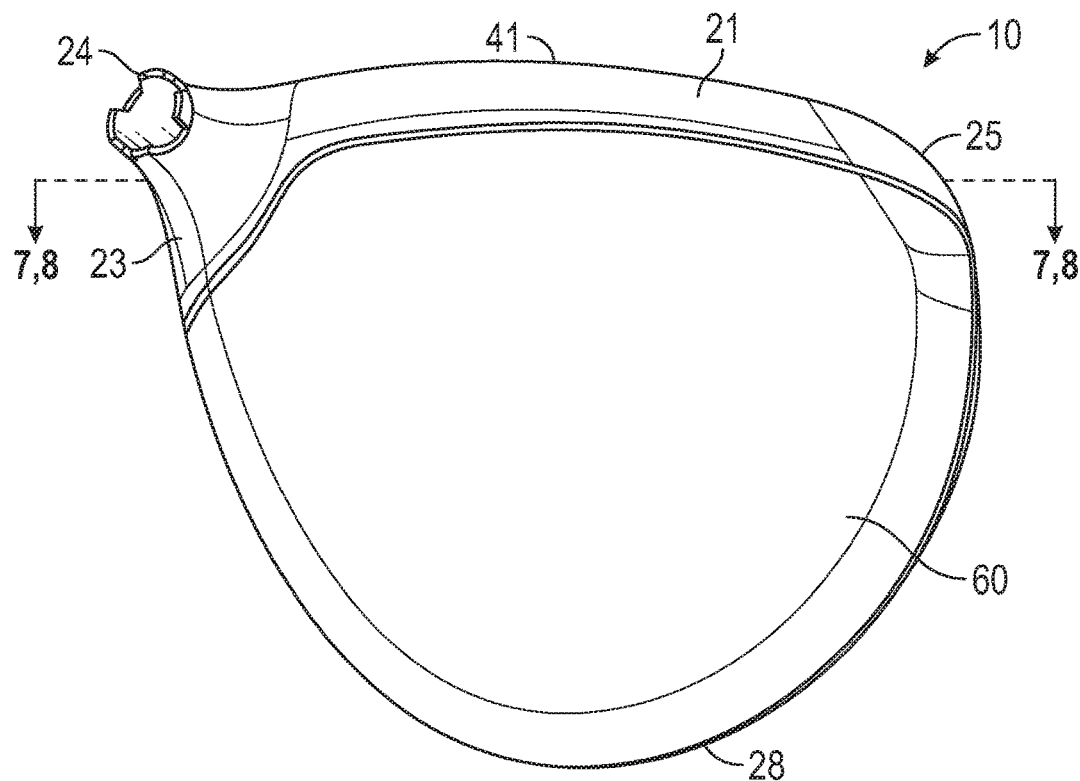
FIG. 1 is a top elevational view of a first embodiment of the golf club head of the present invention.
Figure 2:
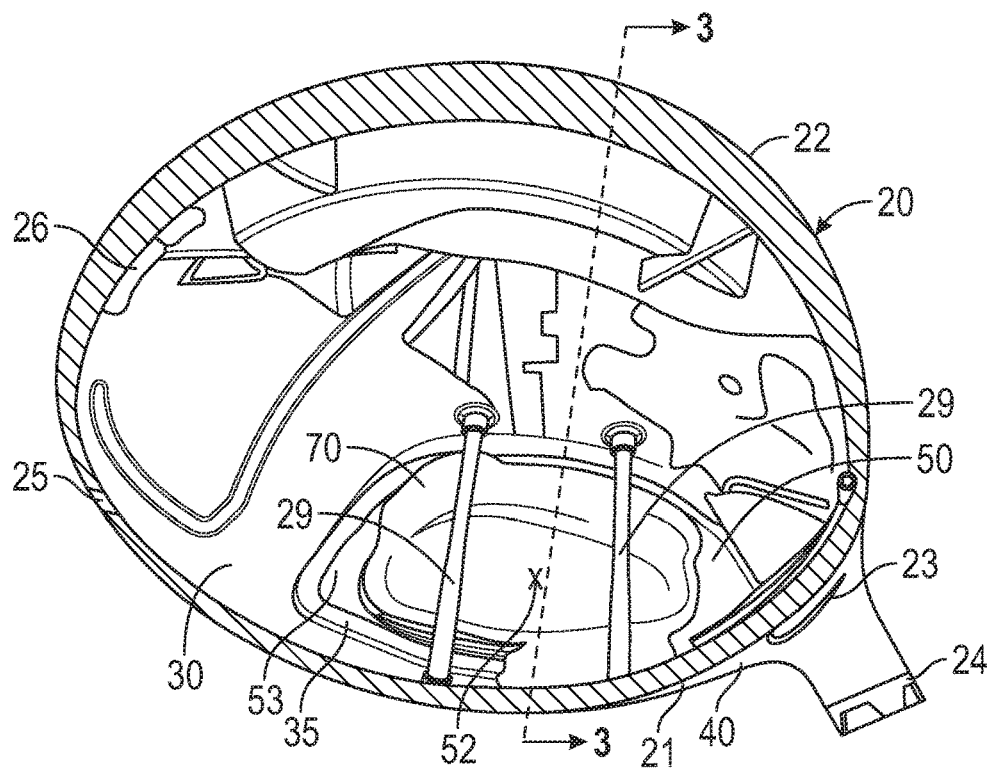
FIG. 2 is a perspective view of the golf club head shown in FIG. 1 with its crown removed.
Figure 3:
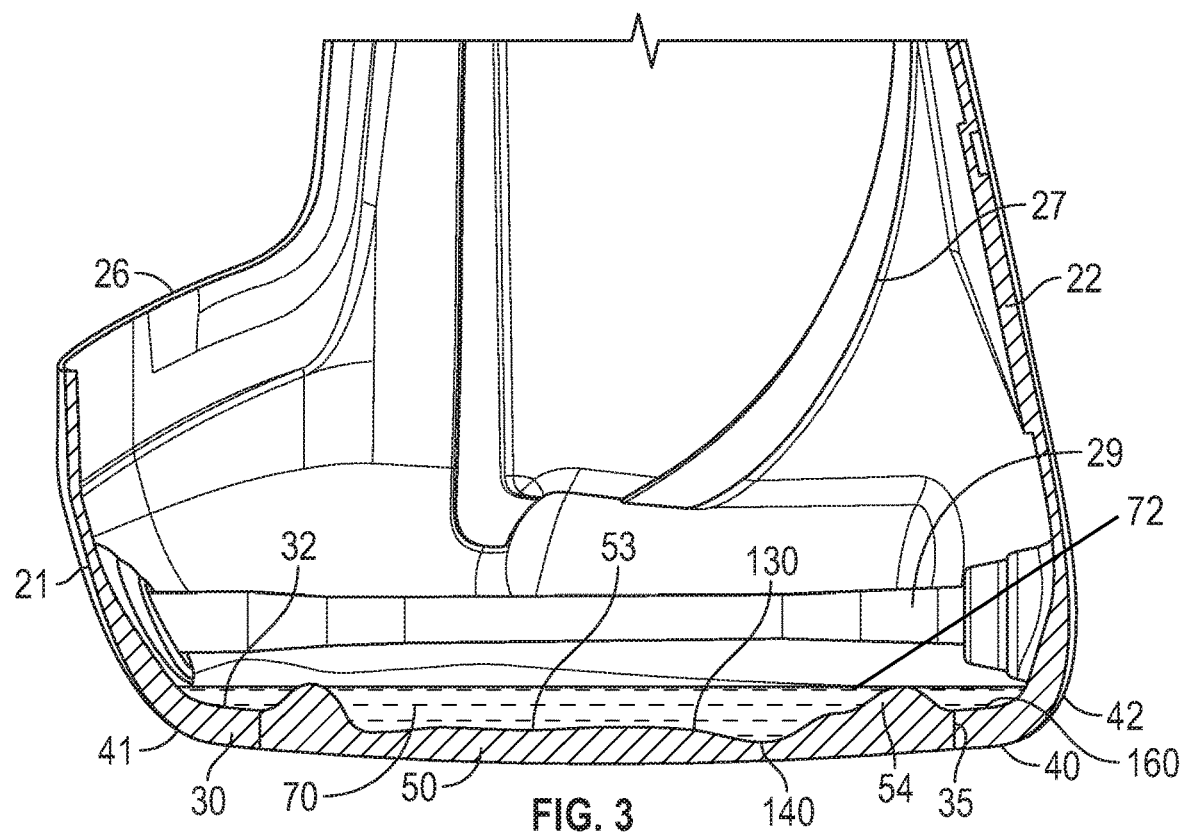
FIG. 3 is a cross-sectional view of the golf club head shown in FIG. 2 taken along lines 3-3.

As shown in FIGS. 1-3, the first embodiment of the present invention is directed to a wood type golf club head 10, such as driver or a fairway wood. The golf club head 10 includes a body 20 having a face wall 30 with a face opening 35, a boundary 40, a return section 21 extending rearwards away from an upper portion 41 of the boundary 40, a sole section 22 extending rearwards away from a lower portion 42 of the boundary 40, a hosel 24 for engaging a shaft, a heel end 23, a toe end 25, an upper opening 26, a hollow interior 27, and an aft end 28. The body also includes one or more (preferably two) stiffening members 29 extending between the return section 21 and the sole section 22 within at least 1.00 inch of the rear surface 32 of the face wall 30. A crown 60, which is preferably composed of a carbon composite material, is affixed to the body 20 and covers the upper opening 26 to enclose the hollow interior 27.

A face insert 50 comprising a striking face surface 51, a geometric face center 52, a rear surface 53, and a variable thickness pattern 54 is permanently fixed, via welding or another means known to a person skilled in the art, to the body 20 to close the face opening 35. The variable thickness pattern 54 includes a central ring 55 or thickness region encircling the geometric face center 52 and having a first thickness $FT_1$, a second ring 56 or first intermediate thickness region encircling the central ring 55 and having a second thickness $FT_2$ that is less than the first thickness $FT_1$, a third ring 57 or second intermediate thickness region having a third thickness $FT_3$ that is greater than the first thickness $FT_1$, and a fourth ring 58 or boundary thickness region having a fourth thickness $FT_4$ that is greater than the second thickness $FT_2$ and less than the first thickness $FT_1$. The rings preferably have thicknesses as described herein or in U.S. Pat. No. 9,908,016, the disclosure of which is hereby incorporated by reference in its entirety.

Figure 4:
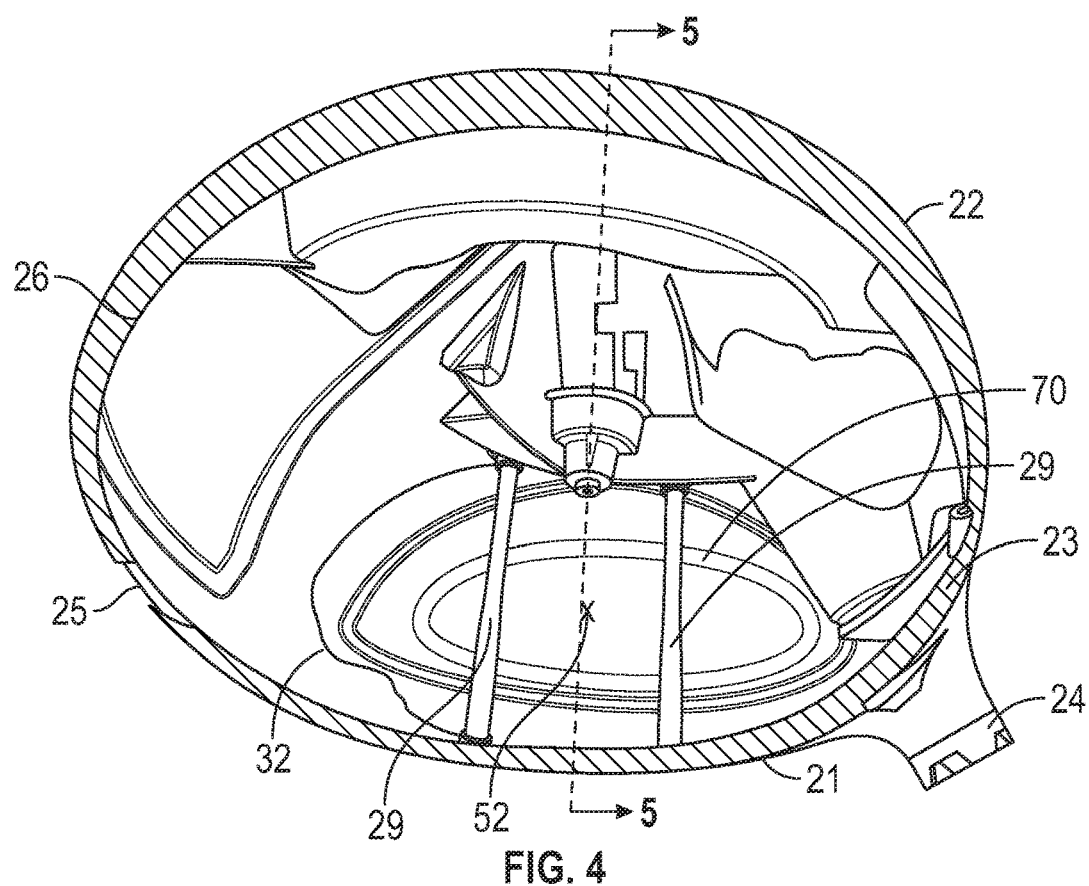
FIG. 4 is a perspective view of a second embodiment of the golf club head of the present invention.
Figure 5:
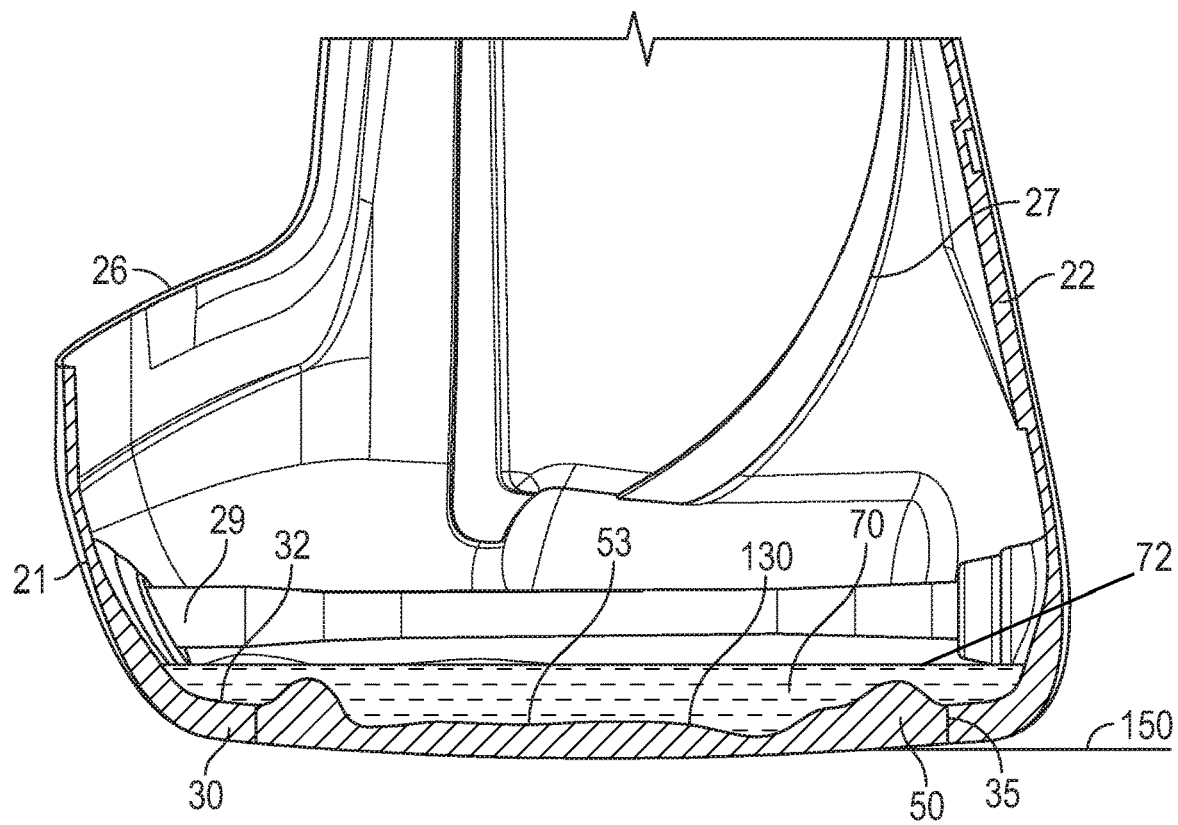
FIG. 5 is a cross-sectional view of the golf club head shown in FIG. 4 taken along lines 5-5.

As shown in FIGS. 2 and 3, the golf club head 10 also includes a coating 70 composed of a polymeric material that covers at least 50% of the rear surface 53 of the face insert 50, and extends onto a rear surface 32 of the face wall 30. The coating 70 has a thickness ranging from 0.025 inch to 0.200 inch, preferably approximately 0.300 inch, and a mass of approximately 5 grams, though it yet another embodiment the mass of the coating 70 may be approximately 2 grams. In a second, preferred embodiment, shown in FIGS. 4-5, the golf club head 10 has most of the same features of the first embodiment, except that the coating 70 covers the entirety of the rear surface 53 of the face insert 50 and at least 75% of the rear surface 32 of the face wall 30. In the preferred embodiment, the coating 70 has a thickness of 0.300 inch and a mass of 10 grams.

The coating 70 is preferably composed of polyurea, a thermoset elastomer that is chemically similar to polyurethane. Polyurea is formed by the poly-addition of an amine and an isocyanate. The amine acts as the soft segment in the microstructure, providing compliance properties, and the isocyanate acts as the hard segment, providing underlying stiffness and rigidity. Compared with other polymers, including polyurethane, polyurea exhibits excellent moisture, chemical, and UV resistance and can operate over a wide range of temperatures. It adheres well to steel under impact loading, and has improved impact mitigation properties compared to other polymers.

Figure 6:
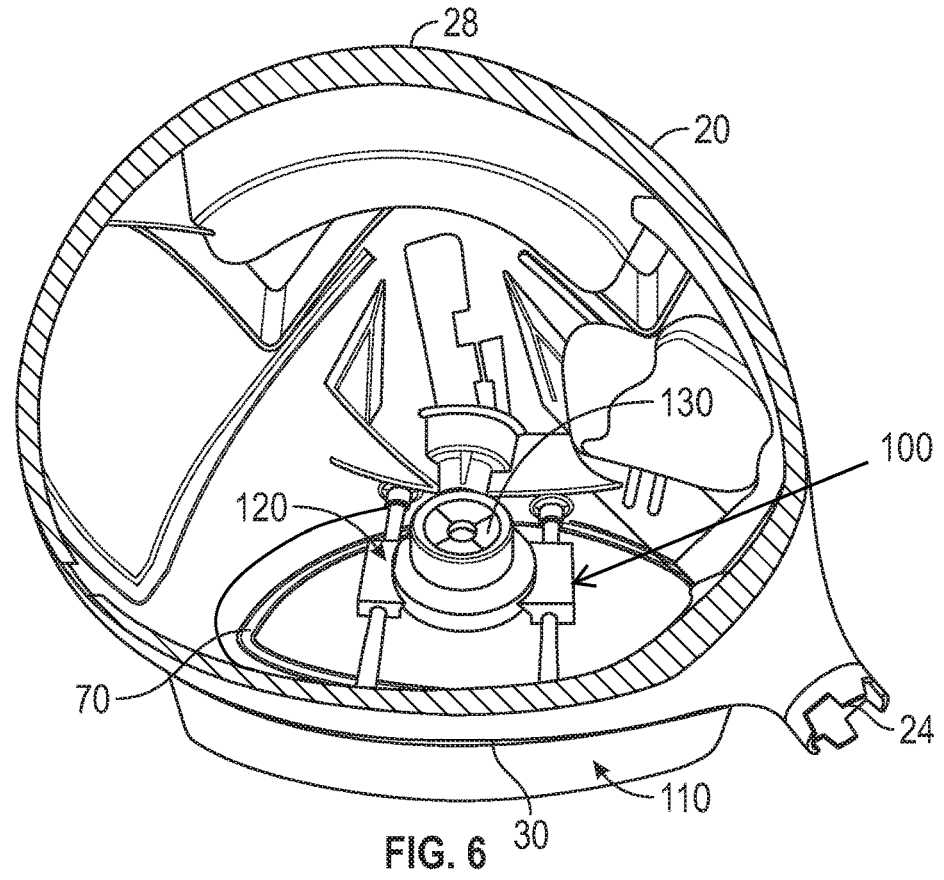
FIG. 6 is a perspective view of the embodiment shown in FIG. 4 engaged with a level assembly.

In both embodiments, the coating 70 is applied after the face insert 50 is welded to the body 20, but before the crown 60 is affixed to the body 20. FIG. 6 illustrates a level assembly 100 that can be used to ensure that the inner-facing surface 72 of the coating 70 is level with a ground plane 150 when it is applied, though the opposite side 74 of the coating 70 must follow the contours of the variable thickness pattern 54. The level assembly 100 includes a contoured stand 110 that supports the face wall 30 so that the aft end 28 is pointing upwards, a bubble level holder 120 that is placed on the stiffening members 29, and a bubble level 130.

Figure 7:
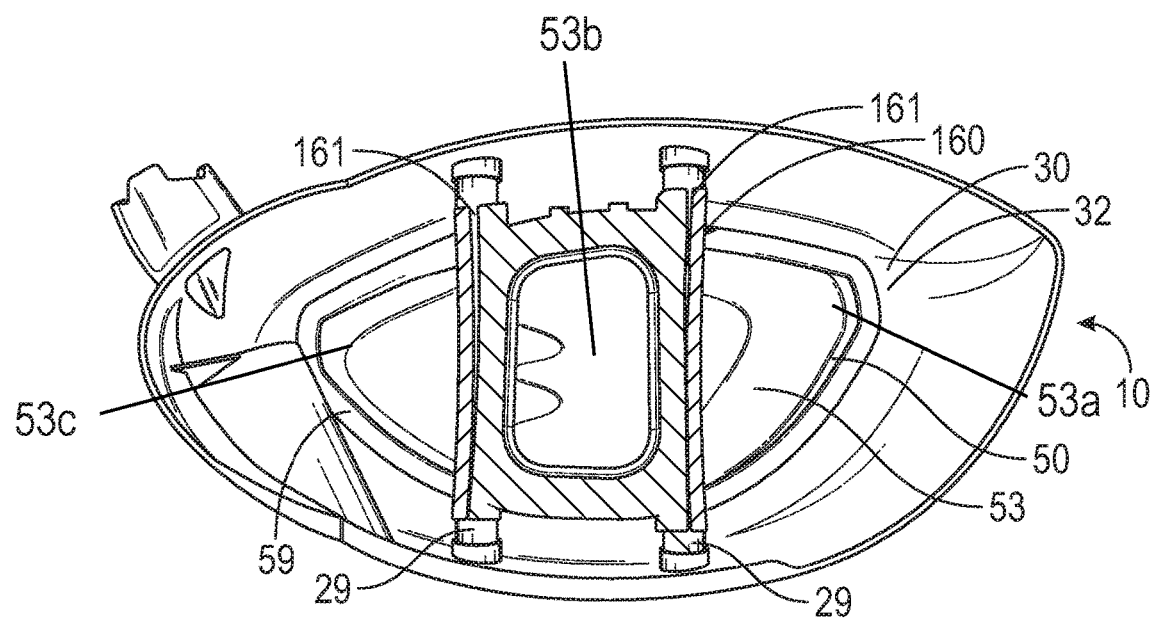
FIG. 7 is a cross-sectional view of the embodiment shown in FIG. 1 taken along lines 7-7 engaged with a first embodiment of a guard fixture of the present invention.
Figure 8:
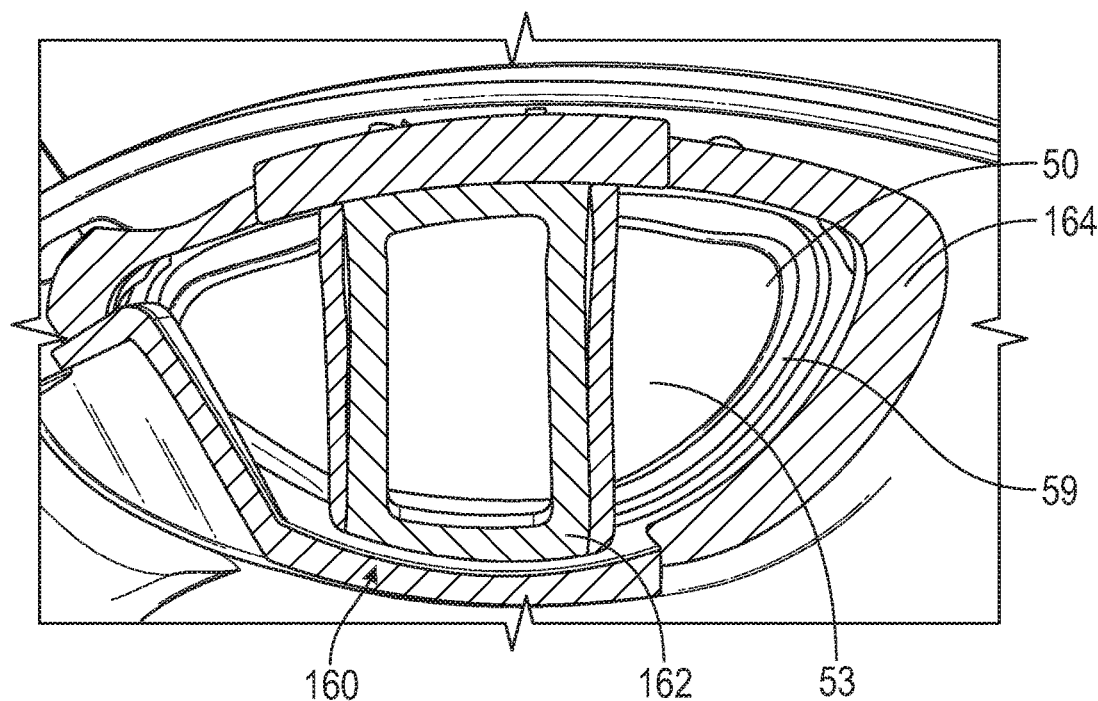
FIG. 8 is a cross-sectional view of the embodiment shown in FIG. 1 taken along lines 8-8 engaged with a second embodiment of a guard fixture of the present invention.

Before the coating 70 material is poured onto the rear surface 53 of the face insert 50, the stiffening members 29 should be covered with a guard fixture 160 that prevents the coating 70 from adhering to them. This is an important step because when the coating 70 is freely poured into the club head 10, the coating 70 connects the stiffening members 29 to the rear surface 53 of the face insert 50, which connection can cause the stiffening members 29 to fail when the golf club head 10 impacts a golf ball. The guard fixture 160 must be composed of a material to which the coating 70 will not adhere, such as silicone, and can be made of one or more parts. For example, as shown in FIG. 7, a single-piece guard fixture 160 covers only the stiffening members 29, thereby protecting only them from coverage by the coating 70, and allowing the rear surface 32 of the face wall 30 be coated along with the rear surface 53 of the face insert 50. Slits 161 are disposed in the guard fixture 160 so that it can be fit around the stiffening members 29. As shown in FIG. 8, a two-piece guard fixture 160 may include the stiffening member-covering central piece 162 shown in FIG. 7 and also include an edge piece 164 that encircles the face insert 50 and ensures that the coating 70 only adheres to the rear surface 53 of the face insert, and not the rear surface 32 of the face wall 30.

Figure 9:
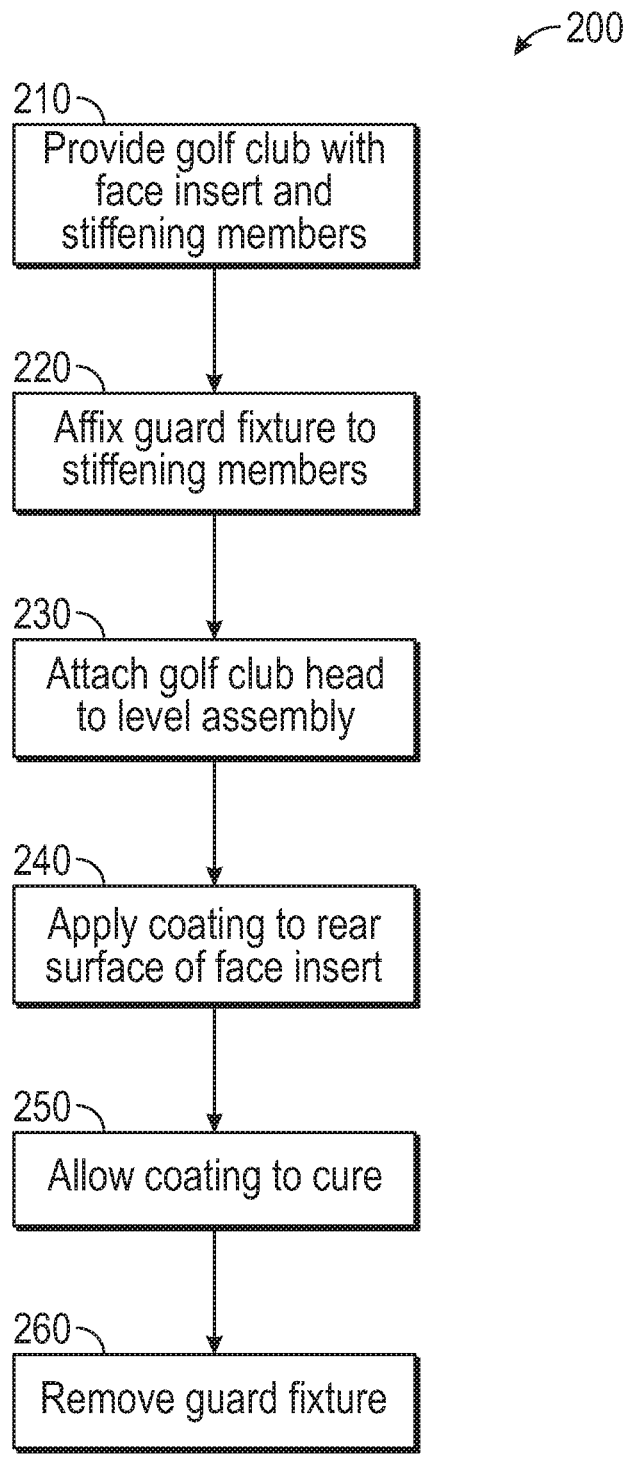
FIG. 9 is a flow chart illustrating a preferred method of the present invention.
Figure 13:
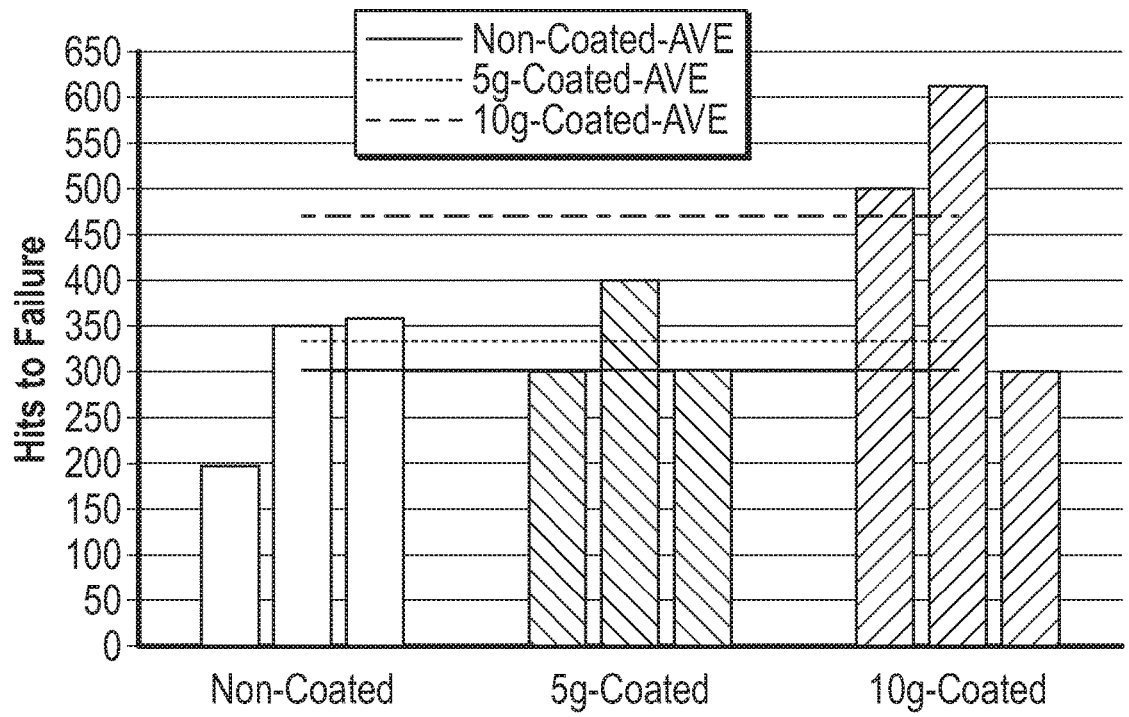
FIG. 13 is a bar graph showing the change in durability of various embodiments of the golf club head of the present invention.
Figure 14:
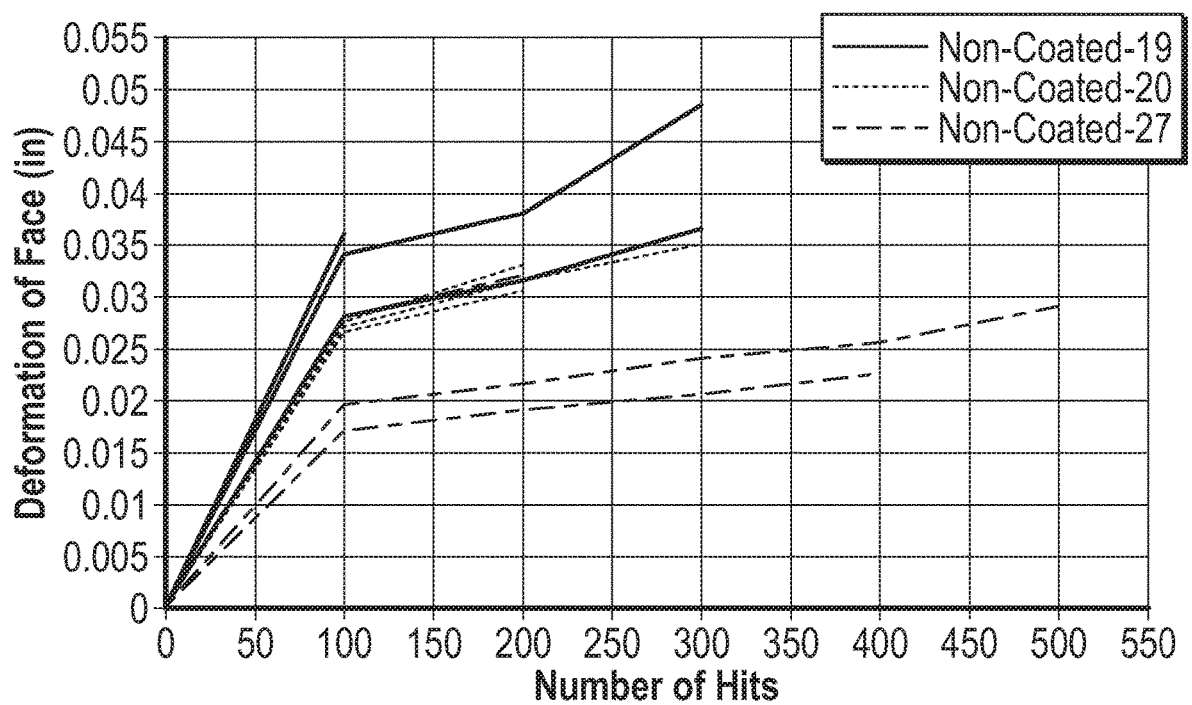
FIG. 14 is a line graph showing the relationship between deformation of the face to hit frequency of various embodiments of the golf club head of the present invention.
Figure 15:
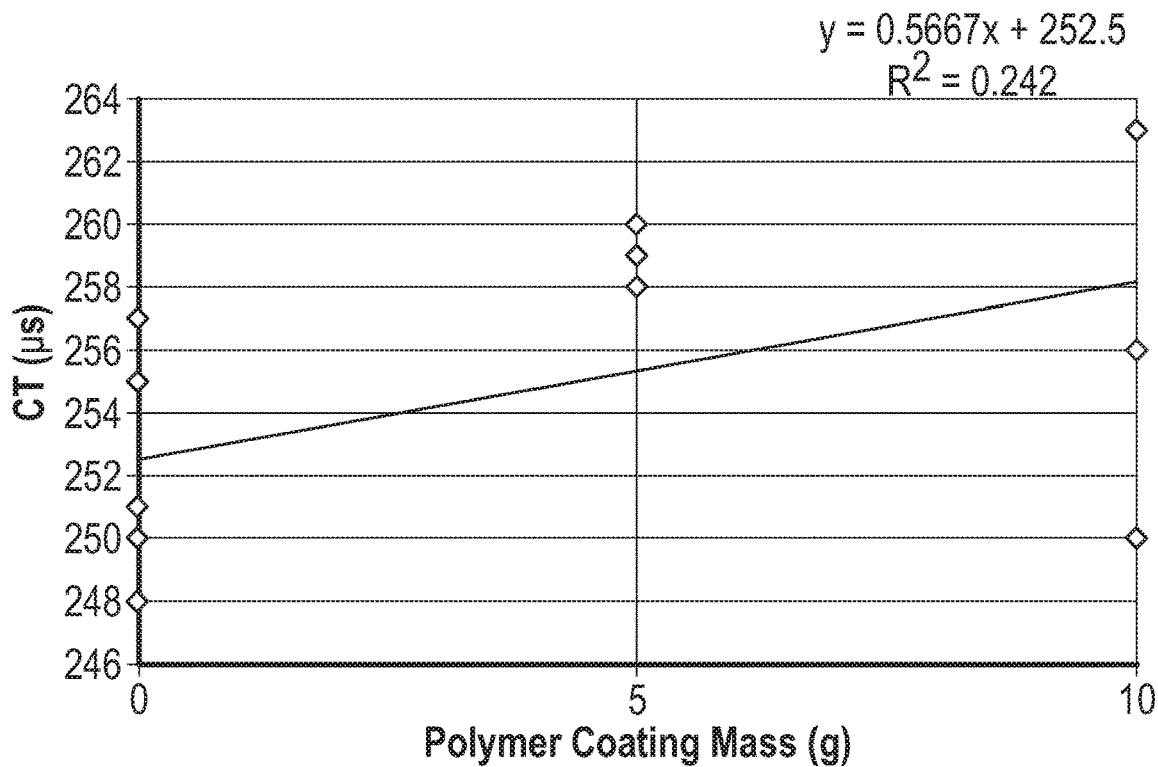
FIGS. 15-18 are line graphs showing the relationships between mass properties and mass of polymer coatings applied to embodiments of the golf club head of the present invention.
Figure 16:
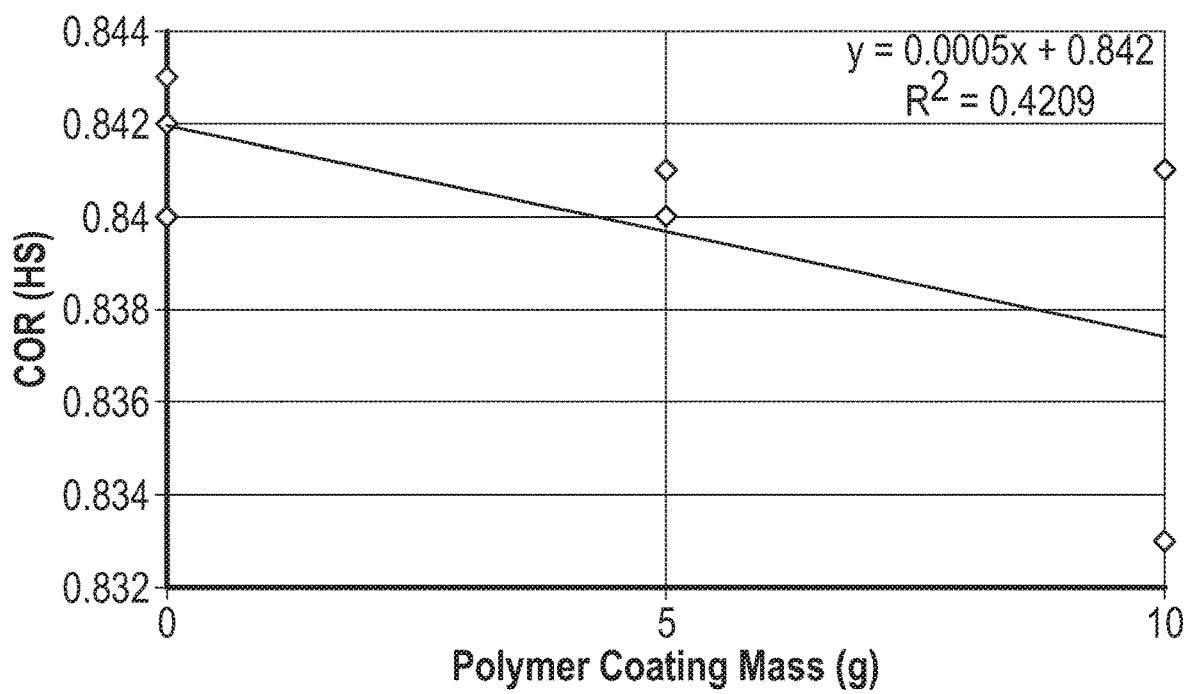
Figure 17:
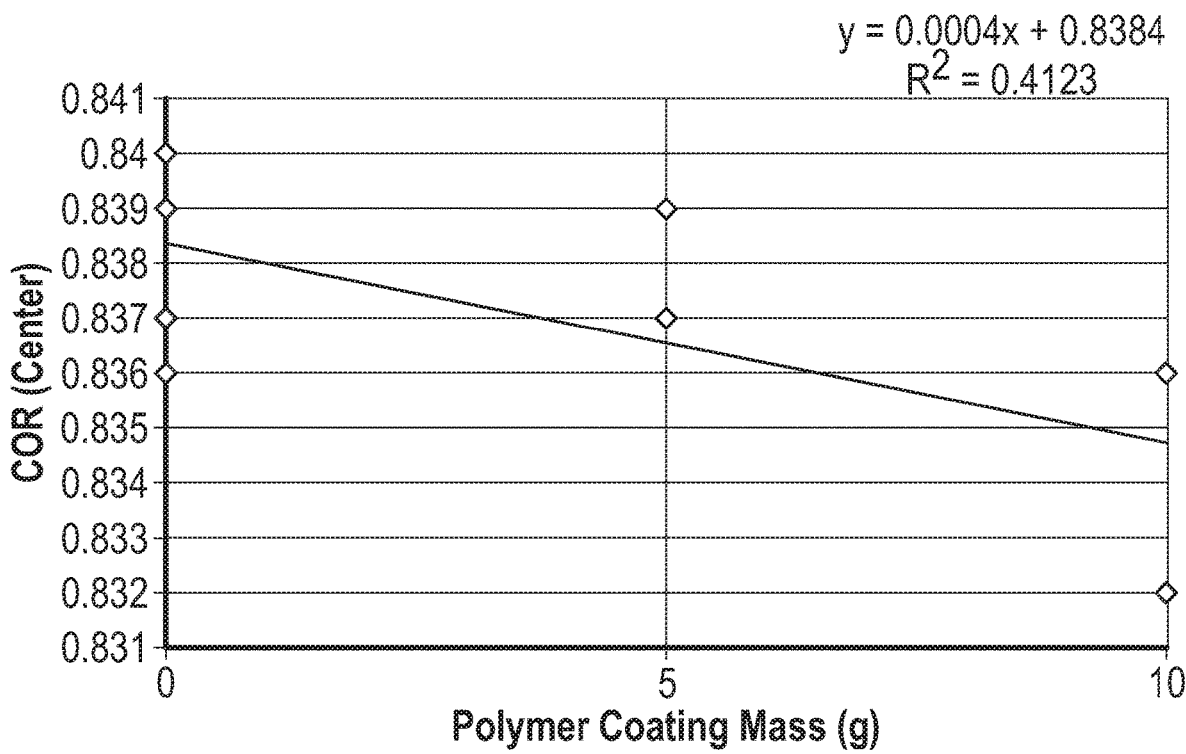
Figure 18:
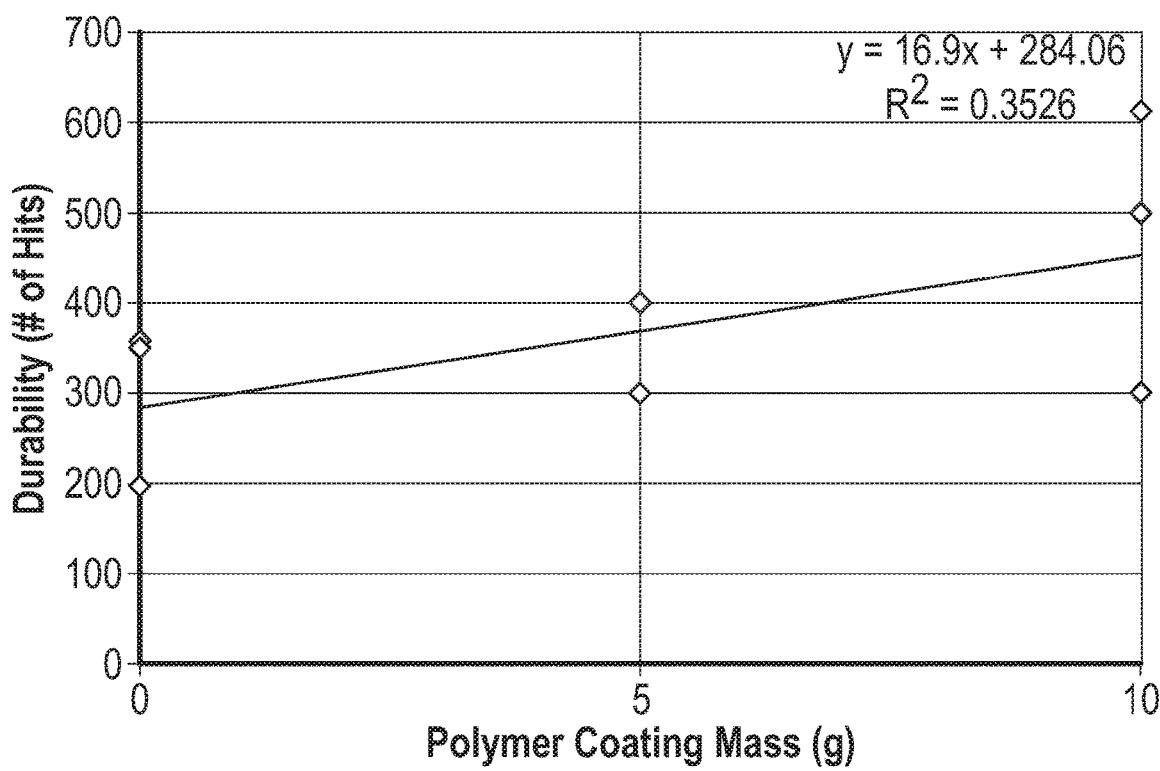

A method 200 of manufacturing the first and second embodiments of the golf club head of the present invention is illustrated in FIG. 9. In a first step 210, the golf club head shown in FIGS. 1 and 2 (minus the coating 70) is provided, and in a second step 220, a guard fixture 160 is affixed to the stiffening members 29. The guard fixture 160 may also include the edge piece 164 disclosed above. In a third step 230, the combined golf club head 10 and guard fixture 160 is affixed to a level assembly 100, and in a fourth step 240, the coating 70 is applied to the rear surface 53 of the face insert 50. In this step, the coating 70 may be poured into the golf club head 10 or applied via syringe and then distributed across the rear surface 53 using a pneumatic air hose. Preferably, 2 to 5 grams, and more preferably 4 grams of the coating 70 is placed on the toe area 53a of the rear surface 53, 2 to 5 grams, and more preferably 4 grams on a center area 53b, and 2 to 5 grams, and more preferably 2 grams on the heel area 53c, between the stiffening members and weld bead 59. The coating 70 should follow the contours of the variable thickness pattern 54, and the surface of the coating that faces the hollow interior 27 of the body 20 should be level with a ground plane. In a fifth step 250, the coating 70 is allowed to cure. Once the coating 70 is solid and tack free, in a sixth step 260, the guard fixture 160 is removed so that the resulting coated golf club head 10 can be finished and then placed into play.

In the first and second embodiments of the present invention, each of the body 20 and the face insert 50 is composed of a metal material such as titanium alloy or steel. The face insert 50 is preferably composed of a metal that is different from the metal of the body 20, such as SP700 titanium alloy, carpenter steel, or the like. The body 20 is preferably a cast from a metal material and the face insert 50 is preferably forged or formed from a metal material, such as titanium alloy or stainless steel.

The performance benefits of the coating 70 of present invention were tested on three types of golf club heads 10; the first and second embodiments of the golf club head 10 disclosed herein, and on golf club heads 10 having all of the same features of the first and second embodiments disclosed herein except for the coating 70. Characteristic time (CT) and coefficient of restitution (COR) tests were performed with golf balls striking proximate or at the geometric face center 52 of the face insert 50 at 150 mph for each of the measured golf club heads 10.

FIGS. 10-18 illustrate the performance benefits of applying a coating 70 comprising polyurea to the rear surface 53 of the face insert 50 and the rear surface 32 of the face wall 30. For example, as shown in FIGS. 10-12, the 5-gram coating 70 of the first embodiment of the present invention increases the durability of the golf club head 10 by 32 hits compared with non-coated heads, a 10.5% increase. The coating 70 also increased the CT by 7 µs and reduced the COR by 0.002, changes of 2.8% and 0.2%, respectively. The 10 gram coating 70 of the preferred embodiment improved the durability of the golf club head 10 even more, with an increase of 169 hits to failure when compared to non-coated heads, a 56.0% increase. The coating 70 of the preferred embodiment increased CT by only 4.3 µs and reduced COR by only 0.004, changes of 1.7% and 0.5%, respectively.

In summary, when applied to the first and second embodiments of the golf club head 10 described herein, the coating 70 improves the durability of the face insert 50, and allows for improved performance because it allows for reduction in face thickness and easy post-process manipulation to allow for fine-tuning CT and COR after production. The reduction in thickness also leads to a weight reduction, because the polymer is roughly a quarter of the density of titanium or stainless steel. This provides for increased lifespan of the club.

Each of the first and second embodiments of the golf club head 10 preferably has a volume ranging from 200 cubic centimeters to 600 cubic centimeters, more preferably from 300 cubic centimeters to 500 cubic centimeters, and most preferably from 420 cubic centimeters to 470 cubic centimeters, with a most preferred volume of 460 cubic centimeters. In the preferred embodiment, the golf club head 10 has a volume of approximately 450 cc to 460 cc. The volume of the golf club head 10 will also vary between fairway woods (preferably ranging from 3-woods to eleven woods) with smaller volumes than drivers. When designed as a driver, the golf club head 10 preferably has a mass of no more than 215 grams, and most preferably a mass of 180 to 215 grams; when designed as a fairway wood, the golf club head 10 preferably has a mass of 135 grams to 200 grams, and preferably from 140 grams to 165 grams. The golf club head has a coefficient of restitution ranging from 0.81 to 0.94, 0.82 to 0.89, or 0.83 to 0.883.

Though described and illustrated herein in connection with wood-type (fairway and driver) golf club heads having stiffening members 29 in FIGS. 1-18, the present invention, and particularly the unique polyurea coating, can be applied to the rear face surface of other golf club heads, including iron-type golf club heads. Like with the wood-type golf club heads 10, when applied to an iron-type golf club head 80, the coating 70 improves the durability of the face 82, dampens sound on thin face 80 irons, allows for less face yield during use, helps to tighten mass tolerances from manufacturing, and can replace or integrate with a medallion applied to the rear surface 84 of the face 82.

Figure 19:
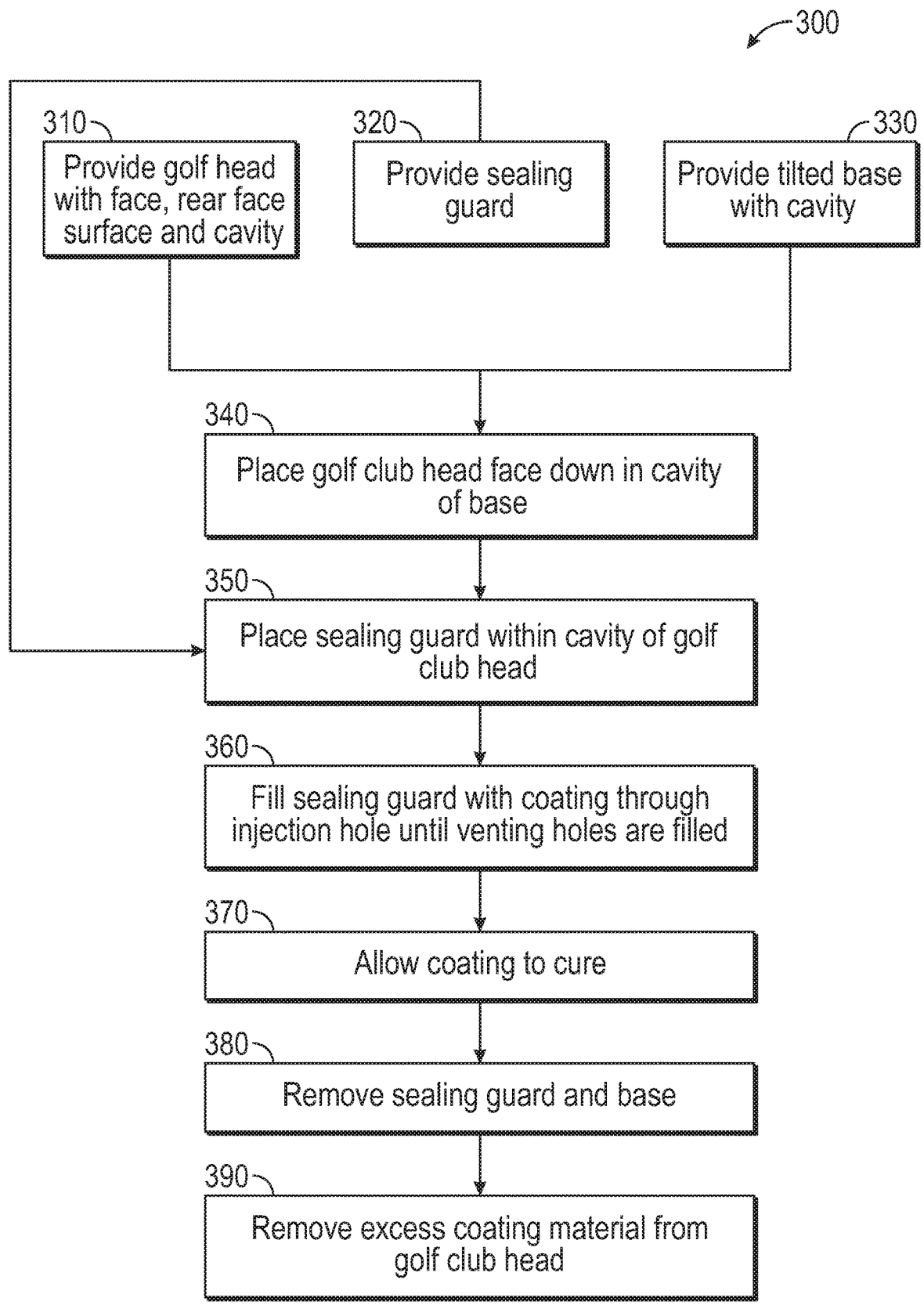
FIG. 19 is a flow chart illustrating another method of the present invention.
Figure 20:
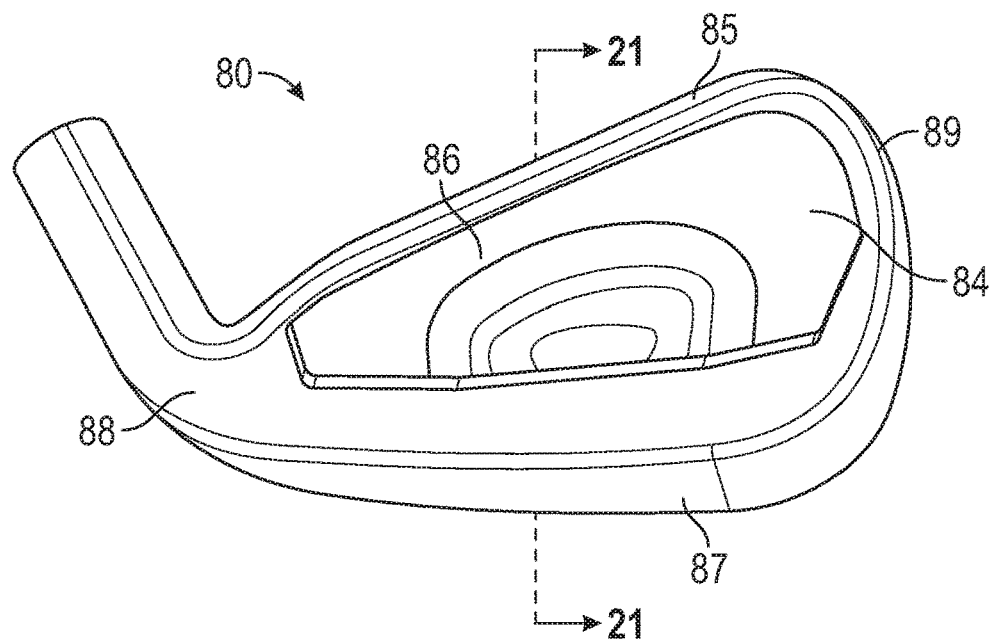
FIG. 20 is a rear elevational view of a golf club head of the present invention.
Figure 21:
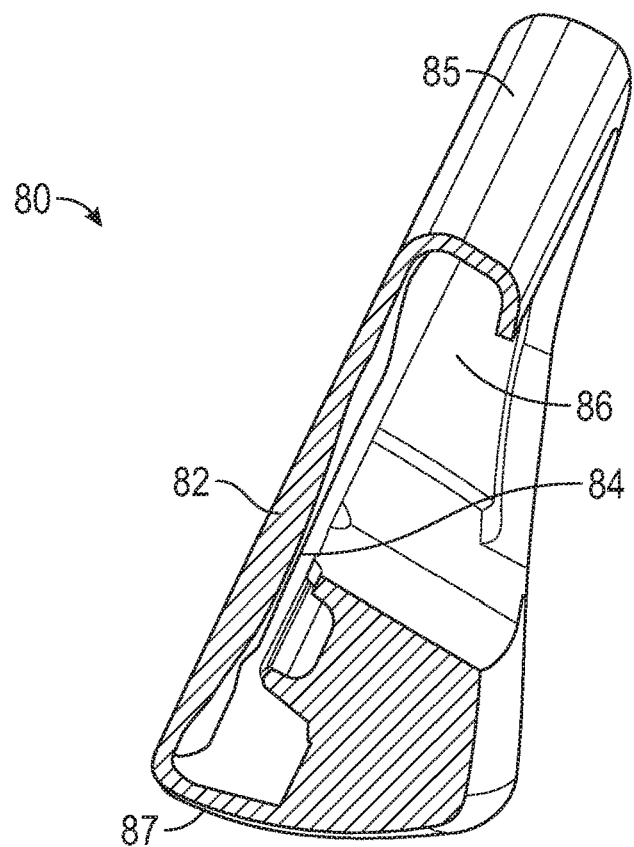
FIG. 21 is a cross-sectional view of the golf club head shown in FIG. 20 taken along lines 21-21.

A method 300 of coating a rear surface 84 of a face 82 of an exemplary iron type golf club head 80 is shown in FIG. 19. This method may also be applied to wood-type golf club heads that do not include stiffening members 29. In a first step 310, a golf club head 80 with a face 82 having a rear surface 84 and a variable thickness, a top portion 85, a sole portion 87, a heel portion 88, and a toe portion 89 at least partially encircling the rear surface 84 to form a cavity 86, such as the one shown in FIGS. 20-21, is provided.

Figure 22:
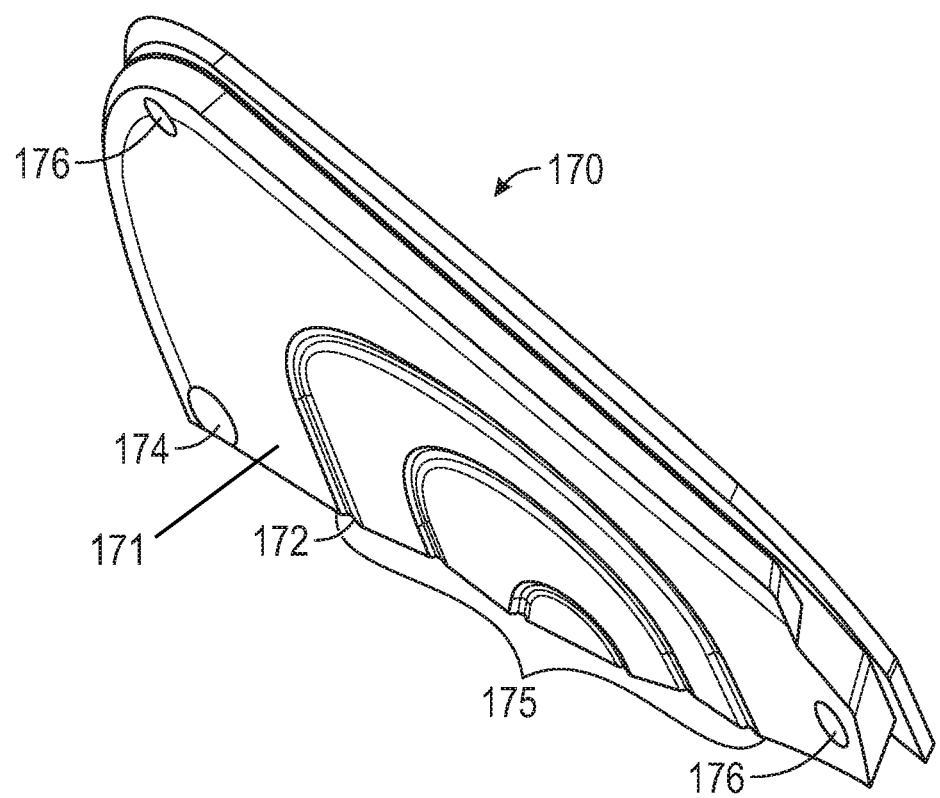
FIG. 22 is a side perspective view of a sealing guard of the present invention.

In a second step 320, a sealing guard 170 such as the one shown in FIG. 22 is provided; this sealing guard 170 has a front surface 171, a rear surface 173, and a cavity region 175 extending into the front surface 171 and having a cavity depth. The cavity region 175 may include grooves 172 and/or a textured pattern to create desired patterns and thicknesses across the rear surface 84 of the face 82. The depth of the cavity region 175 and its texturing defines the thickness and texture of the resulting layer of coating 70, and may be constant or variable. The sealing guard 170 preferably is composed of silicone so that the coating 70 will not bind to it. The sealing guard includes an injection through-hole 174 and a plurality of venting through-holes 176, all extending from the front to rear surfaces 171, 173.

Figure 23:
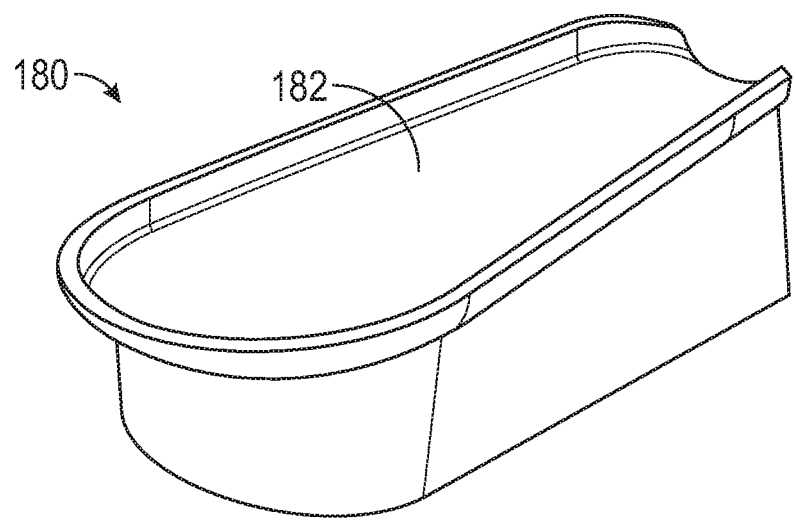
FIG. 23 is a side perspective view of a tilted base of the present invention.

In a third step 330, a titled base 180 is provided. The base 180, shown in FIG. 23, includes a shallow cavity 182 sized to receive the face 82 of the iron-type golf club head 80, and is tilted to allow the coating 70 to flow more easily across the rear surface 84 when applied. The first, second, and third steps 310, 320, 330 may be performed concurrently. In an alternative embodiment, the sealing guard 170, including its injection and venting through-holes 174, 175, may be integrated into the golf club head 10 itself at a lower stress area than the face.

Figure 24:
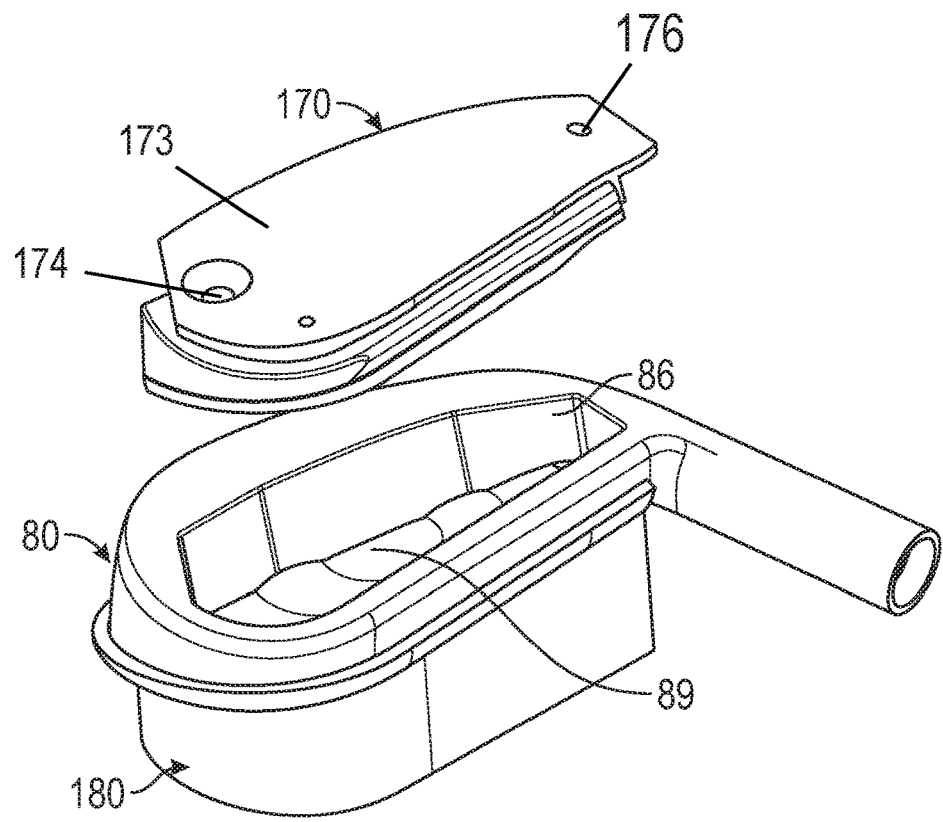
FIG. 24 a partially exploded view of a combination of the golf club head shown in FIG. 20, the sealing guard shown in FIG. 22, and the tilted base shown in FIG. 23.
Figure 25:
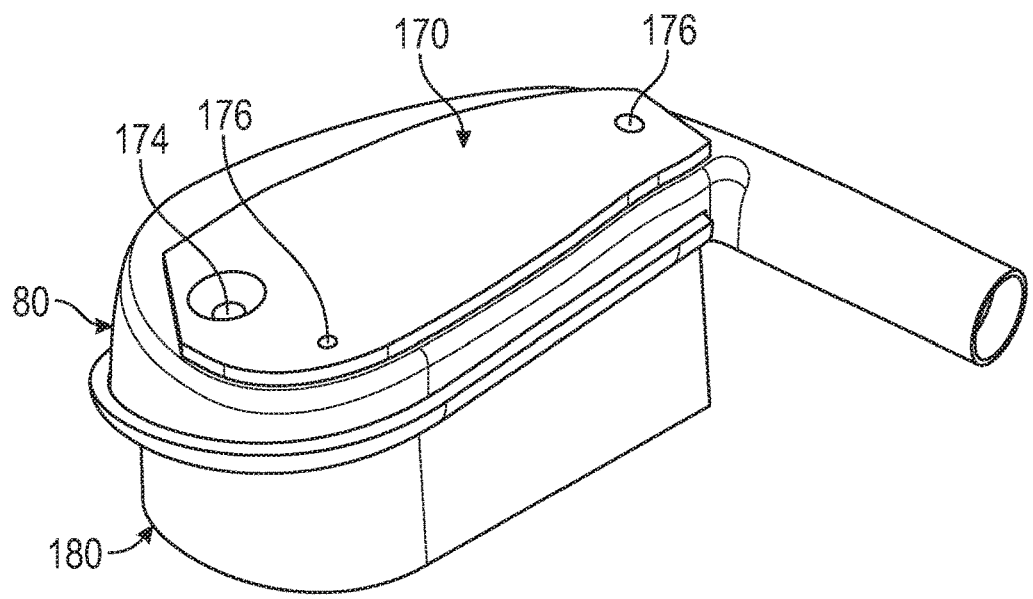
FIG. 25 is a side perspective, fully assembled view of the embodiment shown in FIG. 24.
Figure 26:
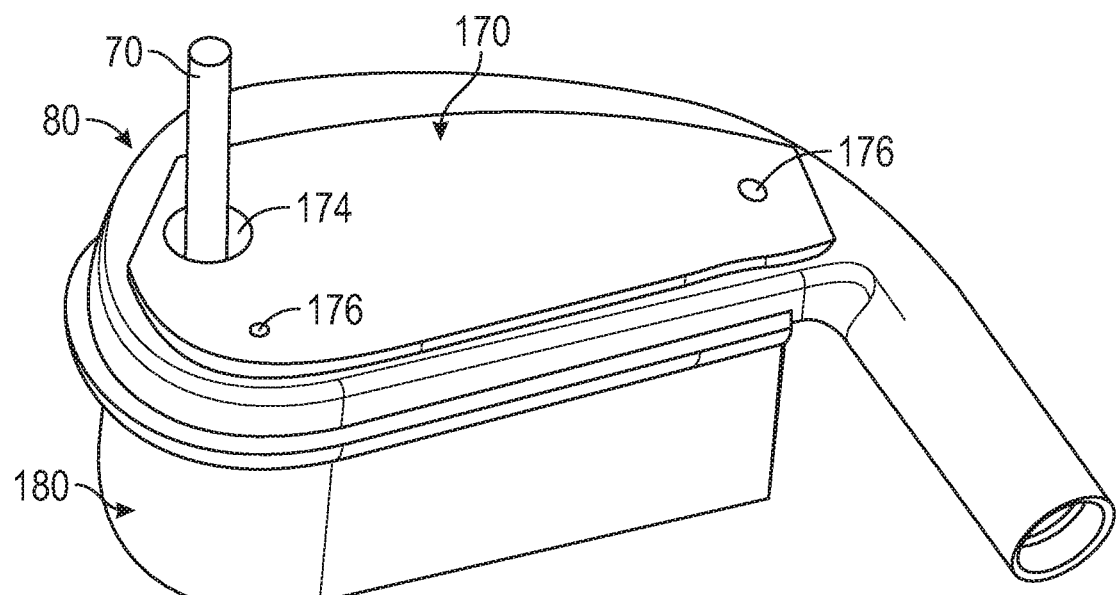
FIG. 26 is a side perspective view of the embodiment shown in FIG. 25 with a coating added via injection hole.
Figure 27:
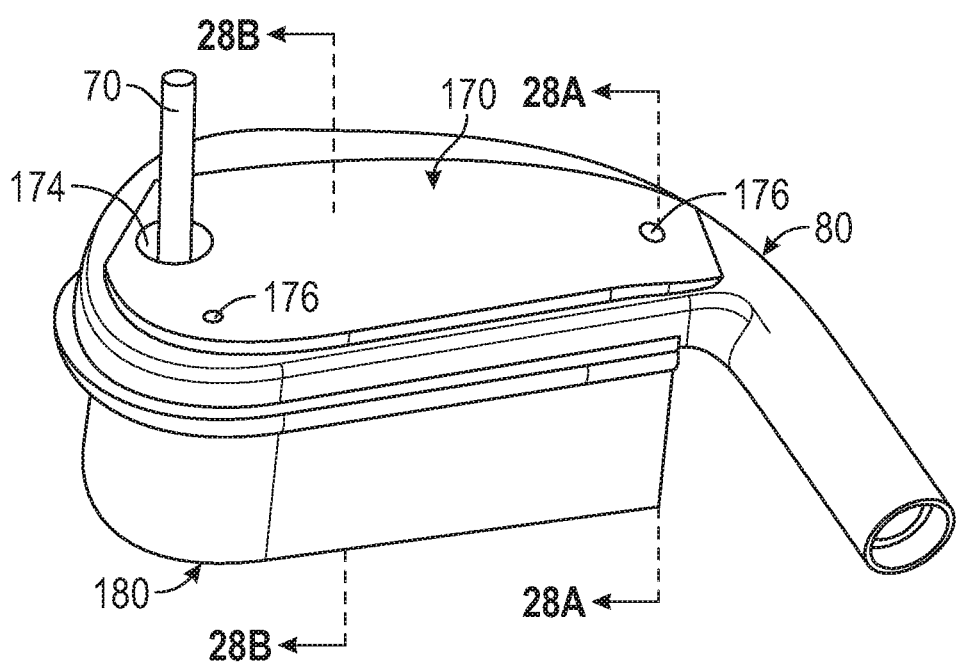
FIG. 27 is a side perspective view of the embodiment shown in FIG. 26 with filled venting holes.
Figure 28A:
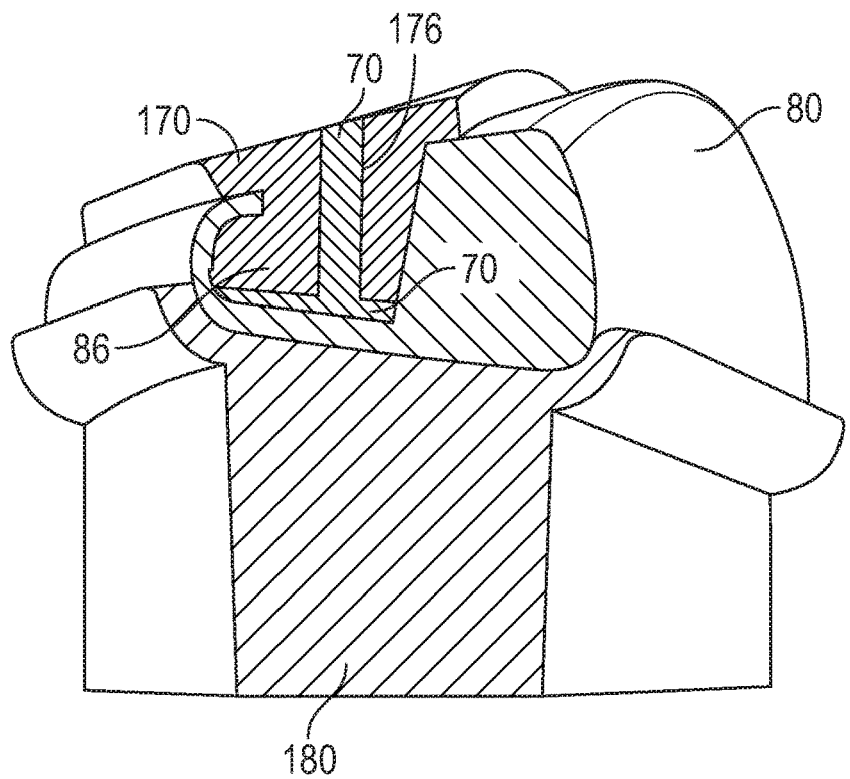
FIGS. 28A and 28B are cross-sectional views of the embodiment shown in FIG. 27 taken along lines 28A-28A and 28B-28B, respectively.
Figure 28B:
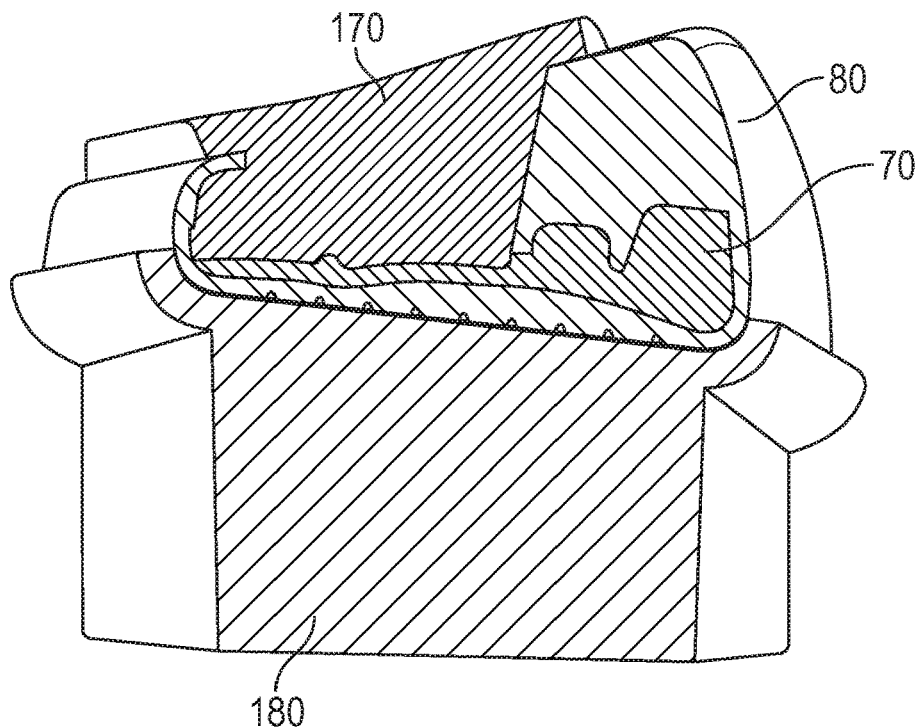
Figure 29:
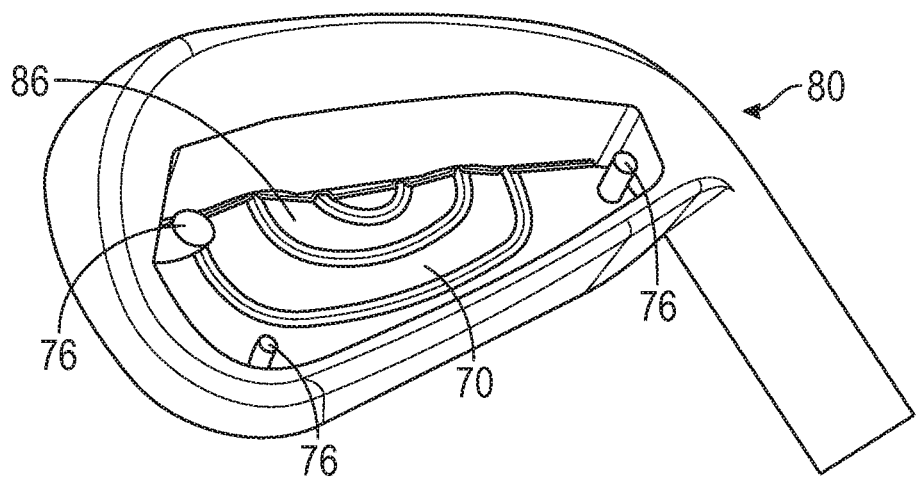
FIG. 29 is a rear perspective view of the golf club head shown in FIG. 27 disengaged from the sealing guard and the tilted base.
Figure 30:
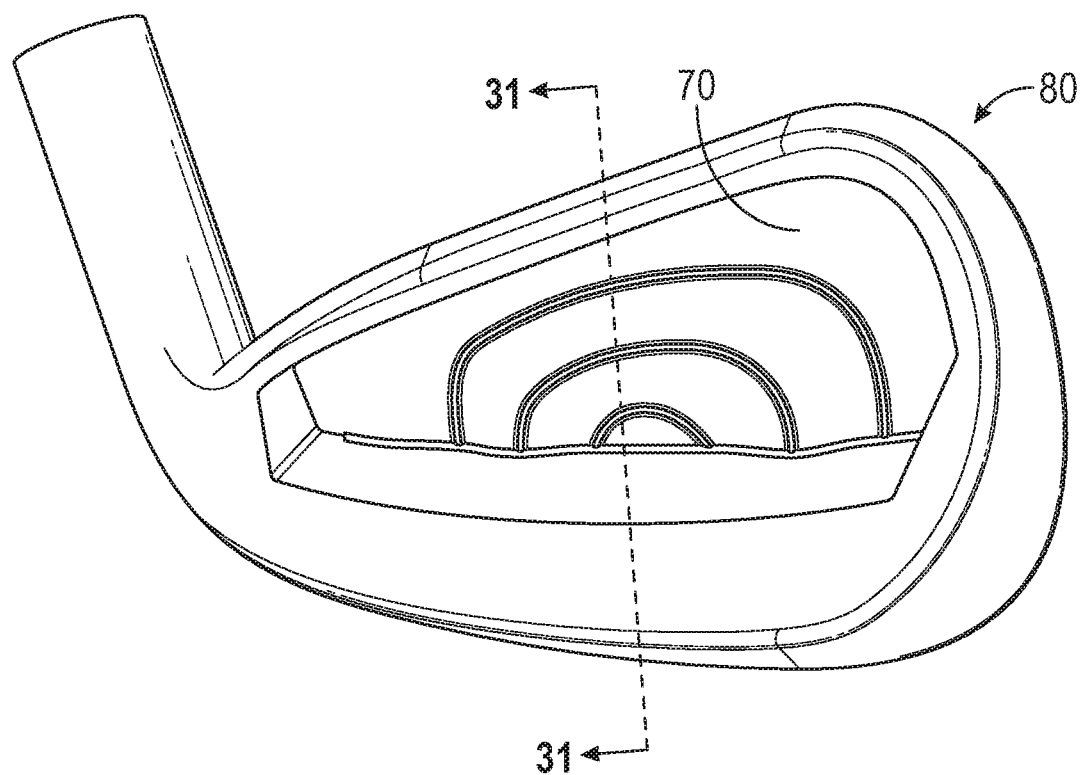
FIG. 30 is a rear perspective view of the golf club head shown in FIG. 29 with the excess coating material removed.
Figure 31:
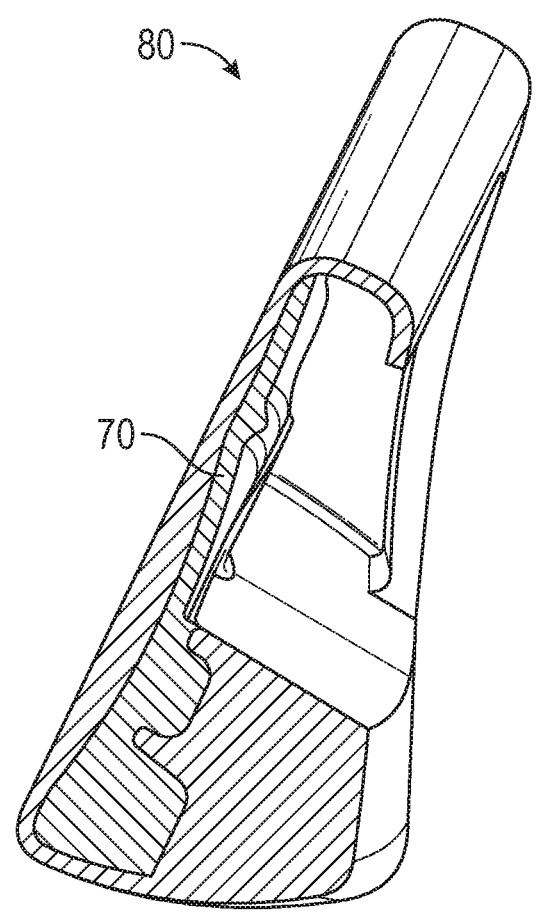
FIG. 31 is a cross-sectional view of the golf club head shown in FIG. 30 taken along lines 29-29.

In a fourth step 340, the golf club head 80 is placed face-down within the shallow cavity 182 of the tilted base 180 so that the rear surface 84 of the face 82 is exposed, as shown in FIG. 24. In a fifth step 350, the sealing guard 170 is placed within the cavity 86 of the golf club head 80 so that the grooves 172 are facing the rear surface 84 of the face 82, as shown in FIG. 25. In a sixth step 360, the coating 70 material is injected into the sealing guard 170 through the injection through-hole 174, as shown in FIG. 26, until the venting holes 176 are filled, as shown in FIG. 27, which indicates that the entire cavity 86 of the iron-type golf club head 80 is filled with either coating 70 or the sealing guard 170, as shown in FIGS. 28A-28B. In a seventh step 370, the coating 70 is allowed to cure, and in an eighth step 380, the sealing guard 170 is removed from the cavity 86 and the golf club head 80 is removed from the base 180. In a ninth step 390, the excess 76 coating 70 retained by the injection and venting through-holes 174, 176, shown in FIG. 29, is trimmed off, leaving a finished golf club head 80 with a fine-tuned coating 70 layer that follows the contours of the face 82 variable thickness pattern and whatever texturing pattern dictated by the cavity region 175 and any grooves 172 or texturing of the sealing guard 170, as shown in FIGS. 30-31. A medallion may then be affixed to the resulting coating 70 layer if desired.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim:

1. A method comprising the steps of:
providing a metal golf club body comprising a front wall with a first interior-facing surface, an exterior-facing surface, and a front opening, a sole section extending from a lower edge of the front wall, a return section extending from an upper edge of the front wall, an upper opening, at least one stiffening member extending between the sole section and the return section, and an aft end opposite the front wall, the return section disposed between the front wall and the upper opening;
welding a metal face insert within the front opening, the face insert comprising a striking surface, a second interior-facing surface, and a variable thickness pattern;
affixing a guard fixture to the at least one stiffening member, wherein the guard fixture comprises a central piece that covers a majority of the at least one stiffening member;
affixing the golf club head to a level assembly;
applying a coating to at least a portion of the second interior-facing surface so that the coating follows the contours of the variable thickness pattern, and so that a rear surface of the coating is level with a ground plane;
allowing the coating to cure; and
removing the guard fixture from the golf club head.

2. The method of claim 1, wherein the step of applying a coating to at least a portion of the second interior-facing surface comprises the steps of applying 2 to 5 grams of the coating to a toe area of the second interior-facing surface, applying 2 to 5 grams of the coating to a central area of the second interior-facing surface, and applying 2 to 5 grams of the coating to a heel area of the second interior-facing surface.

3. The method of claim 1, wherein the guard fixture is composed of silicone.

4. The method of claim 1, wherein the guard fixture further comprises an edge piece sized to encircle the face insert.

5. The method of claim 1, wherein the coating is composed of polyurea.

6. The method of claim 1, wherein the at least one stiffening member is located entirely within 1.00 inch of the second interior-facing surface measured along a vertical plane extending through a geometric center of the face insert.

* * * * *